(12) United States Patent
Coulson

(10) Patent No.: US 9,491,425 B2
(45) Date of Patent: Nov. 8, 2016

(54) DEVICE AND METHOD FOR PROJECTING A SCRAMBLED IMAGE

(75) Inventor: John Lawrence Coulson, Pender Island (CA)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 476 days.

(21) Appl. No.: 13/825,516

(22) PCT Filed: Jul. 10, 2012

(86) PCT No.: PCT/US2012/046050
§ 371 (c)(1),
(2), (4) Date: Mar. 21, 2013

(87) PCT Pub. No.: WO2014/011156
PCT Pub. Date: Jan. 16, 2014

(65) Prior Publication Data
US 2014/0016107 A1 Jan. 16, 2014

(51) Int. Cl.
*H04N 9/31* (2006.01)
*G02B 27/10* (2006.01)
*G06F 21/84* (2013.01)

(52) U.S. Cl.
CPC .......... *H04N 9/3182* (2013.01); *G02B 27/106* (2013.01); *G06F 21/84* (2013.01); *H04N 9/3185* (2013.01); *H04N 9/3194* (2013.01); *H04N 9/3197* (2013.01)

(58) Field of Classification Search
CPC .. G03B 33/12; G02B 27/10; G02B 27/0938; G02B 27/52; G02B 19/0052; H04N 2005/91364; H04N 19/88; H04N 21/235; H04N 21/43637; G06K 9/745; G06K 9/74
See application file for complete search history.

(56) References Cited

U.S. PATENT DOCUMENTS 7,095,540 B1 8/2006 Javidi et al.
7,905,603 B2 * 3/2011 Freeman et al. ............... 353/20
(Continued)

FOREIGN PATENT DOCUMENTS

CN 1435725 A 8/2003
DK WO 0223794 A2 * 3/2002 ............... H04K 1/02
(Continued)

OTHER PUBLICATIONS

Mogensen, P. C. et al., "A Phase-based Optical Encryption System With Polarisation Encoding", Optical Communications, 2000, vol. 173, pp. 177-183.
(Continued)

*Primary Examiner* — Sultan Chowdhury
*Assistant Examiner* — Magda Cruz
(74) *Attorney, Agent, or Firm* — Amin, Turocy & Watson, LLP

(57) ABSTRACT

Technologies are generally described that relate to imaging and viewing systems, devices and methods that can facilitate private viewing of images (e.g., from streaming video). A projection display device can scramble display images such that the display images are viewable by viewers using specialized devices (e.g., eyewear) that can descramble and/or decode the projected display images. The devices may include optical elements that can be modulated to descramble the images and display the images for the viewer. Some devices may also include digital cameras that electronically capture the scrambled images and unscramble the images. Various example devices may include stereoscopic cameras to enable the viewer to see a 3-dimensional image. The images may also be transmitted wirelessly to the devices to enable the viewer to see the multimedia display while on the move and/or shared with other viewers, with limited discomfort resulting from motion.

24 Claims, 12 Drawing Sheets

(56) References Cited

U.S. PATENT DOCUMENTS

| | | | |
|---|---|---|---|
| 2010/0266099 A1 | 10/2010 | Busch et al. | |
| 2012/0035934 A1* | 2/2012 | Cunningham | G06F 1/1639 704/260 |
| 2012/0140096 A1* | 6/2012 | Ostlund | G06F 1/1639 348/241 |

FOREIGN PATENT DOCUMENTS

| | | | |
|---|---|---|---|
| WO | 0223794 | 3/2002 | |
| WO | WO 0223794 A2 * | 3/2002 | H04L 9/00 |

OTHER PUBLICATIONS

International Search Report and Written Opinion for PCT Application Serial No. PCT/US2012/046050, mailed Nov. 5, 2012, 14 pages.
Wikipedia. "Consumer IR", published online at [en.wikipedia.org/wiki/Consumer_IR], retrieved Mar. 25, 2013, 4 pages.
Wikipedia. "Handheld projector", published online at [en.wikipedia.org/wiki/Handheld_projector], retrieved Mar. 25, 2013, 6 pages.
Thinkgeek. "MicroVision SHOWWX+ HDMI Laser Pico Projector", published online at [www.thinkgeek.com/product/eb431], retrieved Mar. 25, 2013, 3 pages.
Wikipedia. "Optical computing", published online at [en.wikipedia.org/wiki/Optical_computing], retrieved Mar. 25, 2013, 4 pages.
Wikipedia. "Photochromic lens", published online at [en.wikipedia.org/wiki/Photochromic_lens], retrieved Mar. 25, 2013, 2 pages.
Rocky Mountain Research Center. "Photonic Computing", published online at [rmrc.org/?page_id=21], retrieved Mar. 25, 2013, 2 pages.
Hanlon, Mike. "A video projector the size of a sugar cube", published online at [www.gizmag.com/go/6175/], Sep. 18, 2006, 4 pages.
Fallon, Sean. "Video: Microvision Pico Projector Throwing iPod Video . . . On Some Dude's Back", published online at [gizmodo.com/341927/video - microvision - pico - projector - throwing - ipod - videoon - some - dudes - back], Jan. 7, 2008, 3 pages.
TechTarget—WhatIs. "What is optical computer (photonic computer)?", published online at [whatis.techtarget.com/definition/optical-computer-photonic-computer], retrieved Mar. 25, 2013, 13 pages.
"Acronyms List," accessed at http://web.archive.org/web/20120428025432/http://www.protocols.com/acronyms_list.htm, accessed on Jan. 9, 2015, pp. 1-6.
"Apache Wave," accessed at http://web.archive.org/web/20120704121719/https://en.wikipedia.org/wiki/Apache_Wave, last modified on Jun. 23, 2012, pp. 1-8.
"Blacklight paint," accessed at http://web.archive.org/web/20120206180144/http://en.wikipedia.org/wiki/Blacklight_paint, last modified on Dec. 24, 2011, pp. 1-4.
"Bluetooth," accessed at http://web.archive.org/web/20120620021831/http://en.wikipedia.org/wiki/BlueTooth, last modified on Jun. 19, 2012, pp. 1-19.
"Decoder glasses," accessed at http://web.archive.org/web/20120630070803/http://www.rainbowsymphony.com/3ddecoder.html, accessed on Jan. 9, 2015, pp. 1-2.
"Drawings of the Eye," accessed at http://web.archive.org/web/20120701131812/http://www.99main.com/~charlief/Blindness.htm, accessed on Jan. 9, 2015, pp. 1-5.
"Electromagnetic Spectrum," accessed at http://web.archive.org/web/20120617160901/http://camillasenior.homestead.com/optics2.html, accessed on Jan. 9, 2015, pp. 1-2.
"Explore the Mariana Trench," accessed at http://web.archive.org/web/20120615232640/http://www.marianatrench.com/, accessed on Jan. 9, 2015, p. 1.
How Do Remote Controls Work?, accessed at http://web.archive.org/web/20120623015211/http://www.wisegeek.com/how-do-remote-controls-work.htm, accessed on Jan. 9, 2015, pp. 1-5.
"How does an infrared remote control work?," accessed at http://web.archive.org/web/20110624024711/http://wiki.answers.com/Q/How_does_an_infrared_remote_control_work, accessed on Jan. 9, 2015, pp. 1-4.
"How many colours are there in the entire spectrum?," accessed at https://answers.yahoo.com/question/index?qid=20100227044634AAnvgIU, accessed at Jan. 9, 2015, pp. 1-2.
"IRD Glass," accessed at http://web.archive.org/web/20120618161052/http://irdglass.com/, accessed on Jan. 9, 2015, pp. 1-2.
"Light & Laser News," accessed at http://web.archive.org/web/20120428210426/http://www.globalspec.com/newsletter/pub/12/light-laser, accessed on Jan. 9, 2015, pp. 1-3.
"Logic gate," accessed at http://web.archive.org/web/20120703013130/https://en.wikipedia.org/wiki/Logic_gate, last modified Jul. 2, 2012, pp. 1-8.
"Making Things Flexible in a Rigid World," accessed at http://www.lenthor.com/?_kk=flex%20circuits&_kt=24eb1805%E2%80%90ad88%E2%80%904b29%E2%80%908766%E2%80%90e296bb99f658&gclid=CPONv%E2%80%906mzasCFRpggwodxTXq3Q, accessed on Jan. 9, 2015, p. 1.
"Microvision Color Eyewear," development program , accessed at www.microvision.com, pp. 1-2 (2007).
"Optics," accessed at http://web.archive.org/web/20120705071741/https://en.wikipedia.org/wiki/Optics, last modified on Jul. 1, 2012, pp. 1-26.
"Pixel perfect: Cornell develops a lens-free, pinhead-size camera," Cornell University Press Office, accessed at http://web.archive.org/web/20120616094251/http://www.pressoffice.cornell.edu/releases/release.cfm?r=58948&y=2011&m=7, released on Jul. 6, 2011, pp. 1-2.
"Polarization Optics," accessed at http://web.archive.org/web/20120205111501/http://www.foctek.com/Products/polarization.htm, accessed on Jan. 9, 2015, pp. 1-2.
"Protocols," accessed at http://web.archive.org/web/20120702221622/http://www.protocols.com/, accessed on Jan. 9, 2015, p. 1.
"Tired of craning your neck to read? Carrying multiple glasses?," accessed at http://web.archive.org/web/20120703015851/http://superfocus.com/, accessed on Jan. 9, 2015, p. 1.
Wendt, A., "Low Light or Infrared Camera Technology—Which Is Right for You ?," accessed at http://web.archive.org/web/20110219181531/http://www.camerasecuritynow.com/News_and_Press/Low-Light-VS-Infrared.asp , posted on Oct. 4, 2006, pp. 1-2.
"Tuomas Vohlonen," accessed at http://en.wikipedia.org/wiki/Tuomas_Vohlonen, accessed on Jan. 17, 2015, pp. 1-2.
"Video Projectors Shrink to 'Pico' Size, Creates a 20 Million Unit Market," accessed at http://web.archive.org/web/20110425181731/http://www.instat.com/newmk.asp?ID=2785&SourceID=000000352000000000000, posted on May 24, 2010, pp. 1-2.
"Wearable Displays: Mobile Device Eyewear," accessed at http://web.archive.org/web/20120608173243/http://www.microvision.com/wearable_displays/mobile.html, accessed Jan. 9, 2015, pp. 1-2.
Bouas-Laurent, H., and Dürr, H., "Organic Photochromism," Pure Appl. Chem., vol. 73, No. 4, pp. 639-665 (2001).
Coxworth, B., "New material claimed to store more energy and cost less money than batteries," accessed at http://web.archive.org/web/20120118075728/http://www.gizmag.com/energy-storage-membrane-created/19996/, posted on Sep. 29, 2011, pp. 1-7.
Kumar, N., "Micro Video Projector Can Be Integrated Into Cellphones," accessed at http://web.archive.org/web/20110604035206/http://www.psfk.com/2010/09/micro-projector-can-be-integrated-in-cellphones-micro-video-projector.html/, posted on Sep. 15, 2010, pp. 1-5.
Saenz, A., How Does Stephen Hawking Talk?, accessed at http://web.archive.org/web/20120629002233/http://singularityhub.com/2010/05103/how-does-stephen-hawking-talk-video/, posted on Mar. 3, 2010, pp. 1-7.

* cited by examiner

DEVICE AND METHOD FOR PROJECTING A SCRAMBLED IMAGE

CROSS-REFERENCE TO RELATED APPLICATION

The subject application is a U.S. national stage application under 35 U.S.C. §371 of PCT Application No. PCT/US12/46050, filed Jul. 10, 2012, and entitled "PORTABLE MULTIMEDIA DISPLAY," the disclosure of which is incorporated herein by reference in its entirety.

TECHNICAL FIELD

The subject disclosure relates generally to portable multimedia projection and display systems.

BACKGROUND

Unless otherwise indicated herein, the materials described in this section are not prior art to the claims in this application and are not admitted to be prior art by inclusion in this section.

With a portable multimedia device with a display screen and audio output, people can browse the Internet, view videos, play games, and accomplish other similar tasks from practically anywhere. There is a user-friendliness/nuisance trade-off however. As screens increase in size to be easier on the eyes and allow a more immersive viewing environment, the displays are less private, and can be a nuisance to others around the viewer. Decreasing the screen size, on the other hand, is more private and less of a nuisance, but the images will be increasingly harder to see.

Personal viewing devices attached to, or integrated with, glasses, goggles, and other eyewear solve some of the nuisance and privacy issues, but a host of other issues may arise in their place with conventional approaches. One such issue is security, where broadcasting media wirelessly to headsets can allow the wireless connection to be intercepted. Another issue is one that has inhibited overall adoption and use of virtual reality headsets. Namely, a visual effect occurs with virtual reality headsets where an entire image is viewed in the glasses or a heads-up display at a fixed size, but moves as the user moves his/her head, which can cause discomfort to users, even nausea and motion-like sickness in some cases.

Another possibility is to use image projection technology to project a personal display onto any appropriate surface that is in front of the viewer. This option suffers from similar drawbacks as the personal display devices, the main drawbacks being privacy and nuisance concerns as mini projectors, attached to the headsets or not, project images and/or video onto publicly viewable display surfaces. Moreover, since overlapping video/images from different projections affects the viewability of both, where wall space is not unlimited, e.g., where a large number of people are present relative to wall space, different users may be forced to compete to use the limited space in an, as of yet, unregulated manner.

SUMMARY

Various non-limiting embodiments generally describe portable multimedia viewing and display systems.

In some example embodiments, projection display devices are described that include an electromagnetic radiation generation unit configured to generate radiation. The various projection display devices can further include an image generation unit configured to receive a control signal and modulate the radiation based on the control signal such that an image is generated. Some projection display devices can also include a beam-splitter unit configured to encode the image, wherein at least one optical element in the beam splitter can be manipulated to scramble the image into a scrambled image. Some projection display devices can also include projection units configured to project scrambled images and non-scrambled images onto a display surface.

Some example embodiments describe methods that may include generating an optical image based on a display image signal and manipulating an optical element that is in a path of the optical image based on a control signal and scrambling the optical image in response to the manipulation. Some methods may also include projecting the scrambled image onto a display surface.

In still other example embodiments, viewing devices are described that may include an intake lens group configured to receive and focus incoming light beams from a scrambled image displayed on a display surface. Some viewing devices can also include a combiner optical group configured to modulate an optical element so that the scrambled image is decoded into a viewable image.

In additional example embodiments, methods are described that may include focusing light beams of a scrambled image reflected from a display surface to generate focused light beams. Various methods may further include receiving the scrambled light beams with a controlled optical element and descrambling the scrambled light beams to generate a viewable image by modulating the controlled optical element. Some methods may also include displaying the viewable image in an eyewear in a line of sight with the display surface.

In some example embodiments, viewing devices are described that may include a camera configured to electronically capture a scrambled image displayed on a display surface and a decoder component configured to unscramble the scrambled image into an unscrambled image. Some viewing devices may also include a display component configured to show the at least one unscrambled image with the viewing device in response to the scrambled image being unscrambled, wherein the at least one unscrambled image may be displayed at a fixed position relative to the scrambled image on the display surface.

In some additional embodiments, methods are described that may include receiving a digital image of a scrambled image and unscrambling the scrambled image into a viewable image. Some methods may also include displaying the viewable image with an ocular device including displaying the viewable image at a fixed position relative to the scrambled image on a display surface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

Various non-limiting embodiments are further described with reference to the accompanying drawings.

DETAILED DESCRIPTION

Overview

Figure 1:
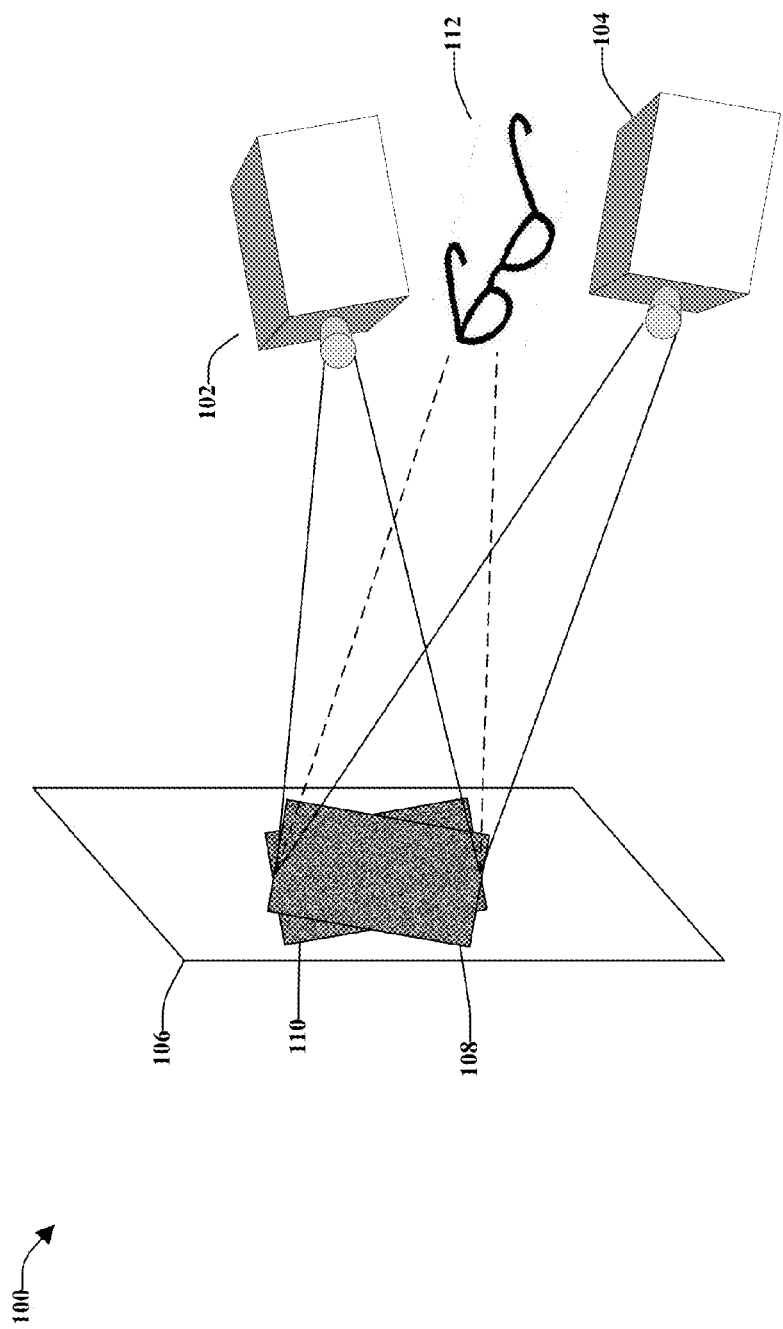
FIG. 1 is a block diagram illustrating an example, non-limiting embodiment of a system for projecting and viewing a scrambled image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

This disclosure is generally drawn, inter alia, to compositions, methods, apparatus, systems, devices, and/or computer program products related to display imaging. Briefly stated, technologies are generally described that relate to imaging and viewing systems, device and methods that can facilitate private and secure viewing of images (e.g., from streaming video). An example projection display device can scramble and/or encode display images such that the display images are viewable by viewers using specialized devices (e.g., eyewear) that can descramble and/or decode the projected display images. The devices may include optical elements that can be modulated to descramble the images and display the images for the viewer. Some devices may also include digital cameras that electronically capture the scrambled images and unscramble the images. Various example devices may include stereoscopic cameras to enable the viewer to see a 3-dimensional image. The images may also be transmitted wirelessly to the devices to enable the viewer to see the image display while on the move and/or shared with other viewers, without discomfort resulting from motion.

In various non-limiting embodiments, a portable multi-media display and viewing system as generally described can be utilized to view images (e.g., multimedia based images) privately and securely. A projection display device can be configured to scramble and/or encode the display such that the display may be viewed using specialized devices (e.g., eyewear) that are configured to descramble and/or decode the projected display images. In some embodiments, the projection display devices can be portable, and carried around by the viewer. In other embodiments, the projection display devices can be attached to, or integrated at least partly with, the display devices (e.g., eyewear, headsets, goggles, glasses, flat panels, etc.) Markers or identifiers (hereinafter referred to simply as "markers") can be encoded into the scrambled display images. A viewing device can be configured to selectively descramble specific scrambled images identified with the markers when there are overlapping scrambled images on the same display surface. Selectively descrambling and displaying scrambled images permit more than one viewer to watch and otherwise interact with multiple image displays that are displayed in or projected on the same place, such as on a limited wall space.

In some embodiments, the viewing devices can be configured to descramble the scrambled image using optical elements such as mirrors, lenses, prisms, filters, etc. The optical elements can be dynamically configured to descramble the scrambled image based on a descrambling algorithm and/or decryption key that is associated with the scrambled image. Access can therefore be limited to viewers that have the decryption key or descrambling algorithm. In other embodiments, the viewing device can be configured to electronically capture the scrambled image (e.g., with a camera). The captured image can then be decoded and/or decrypted using a decoding algorithm and/or decryption key associated with the scrambled image.

Figure 5:
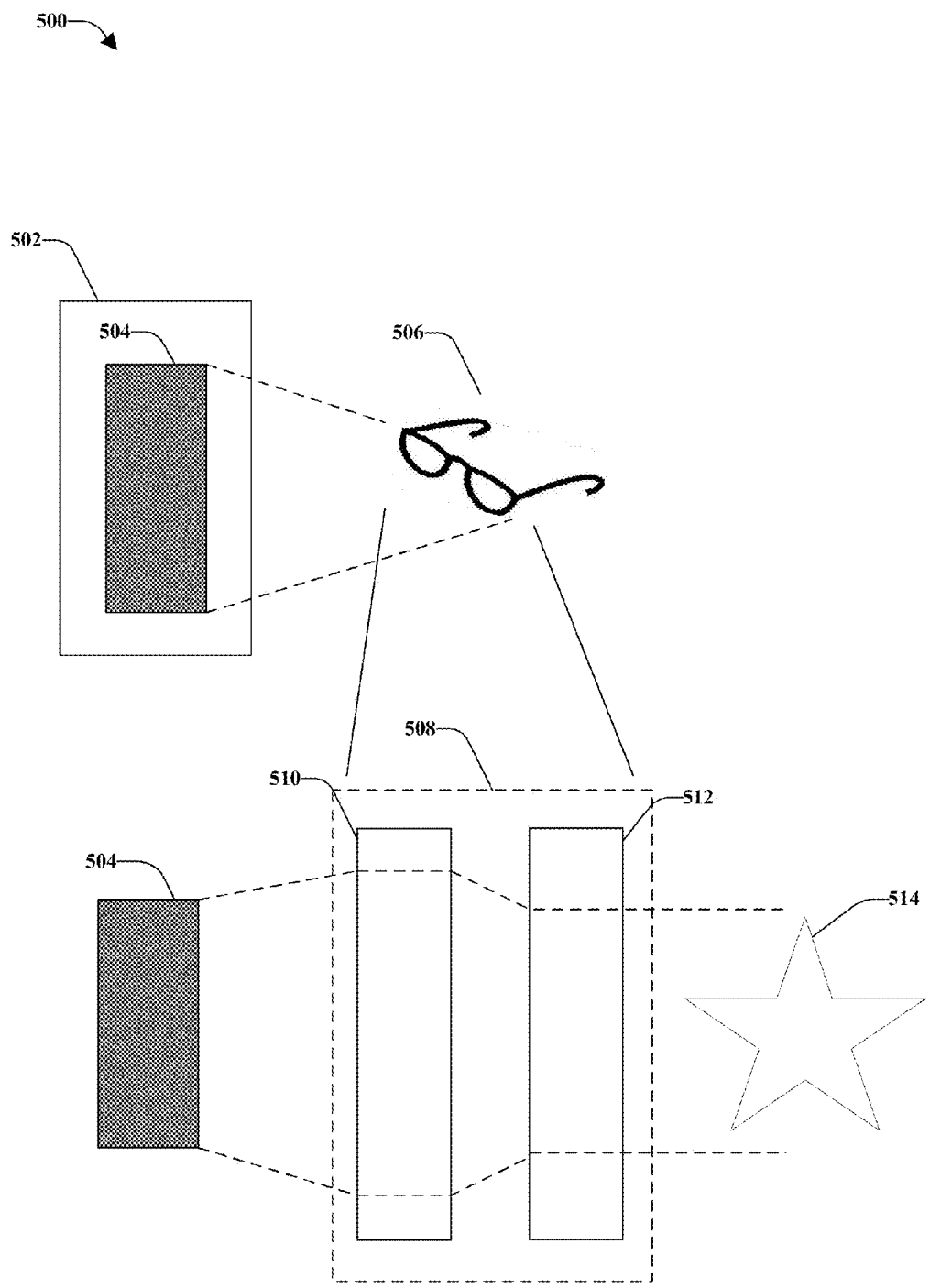
FIG. 5 is a block diagram illustrating an example, non-limiting embodiment of a viewing device for viewing a scrambled image.
Figure 6:
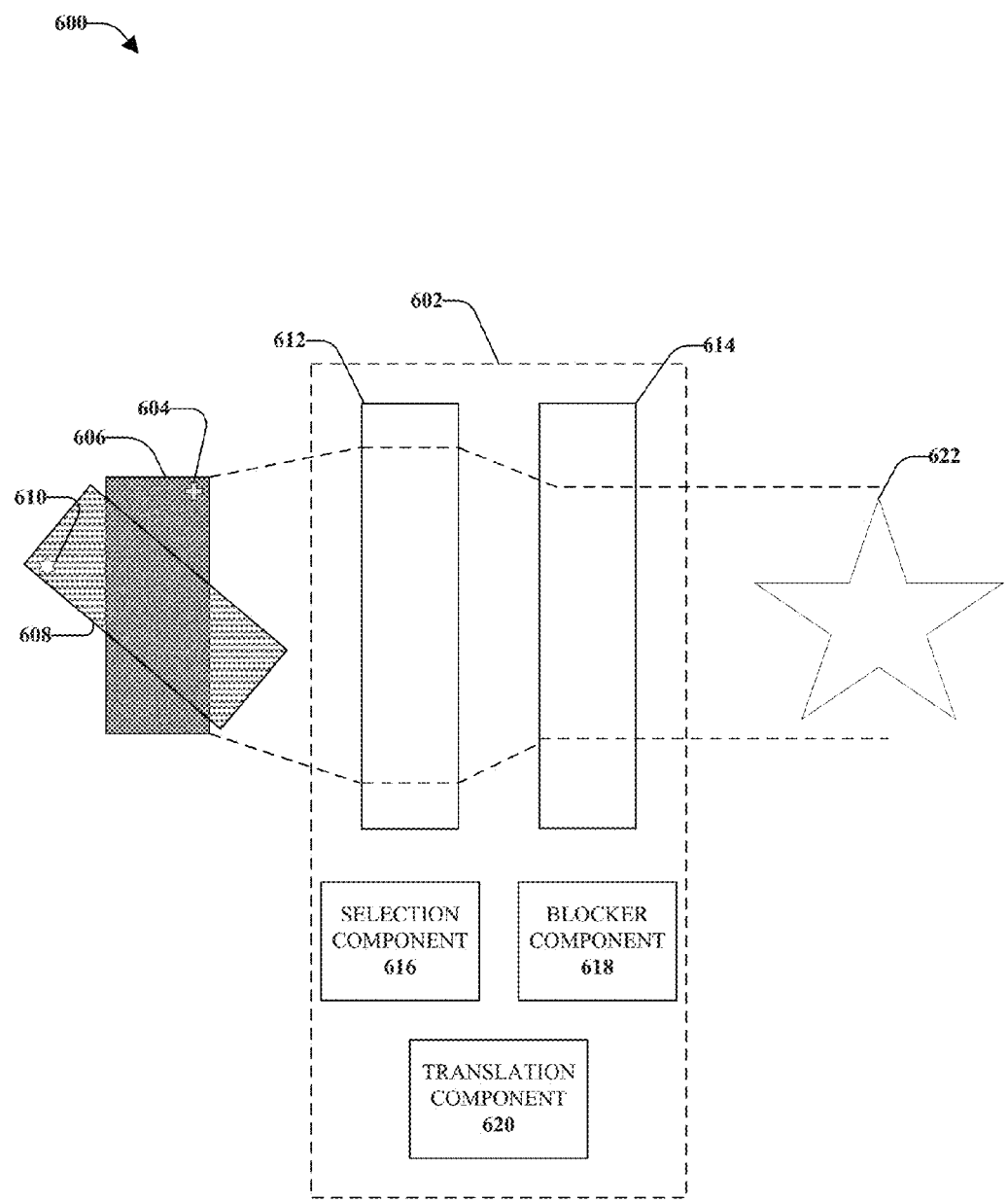
FIG. 6 is a block diagram illustrating an example, non-limiting embodiment of a viewing device that selects a scrambled image to view from a plurality of scrambled images.
Figure 8:
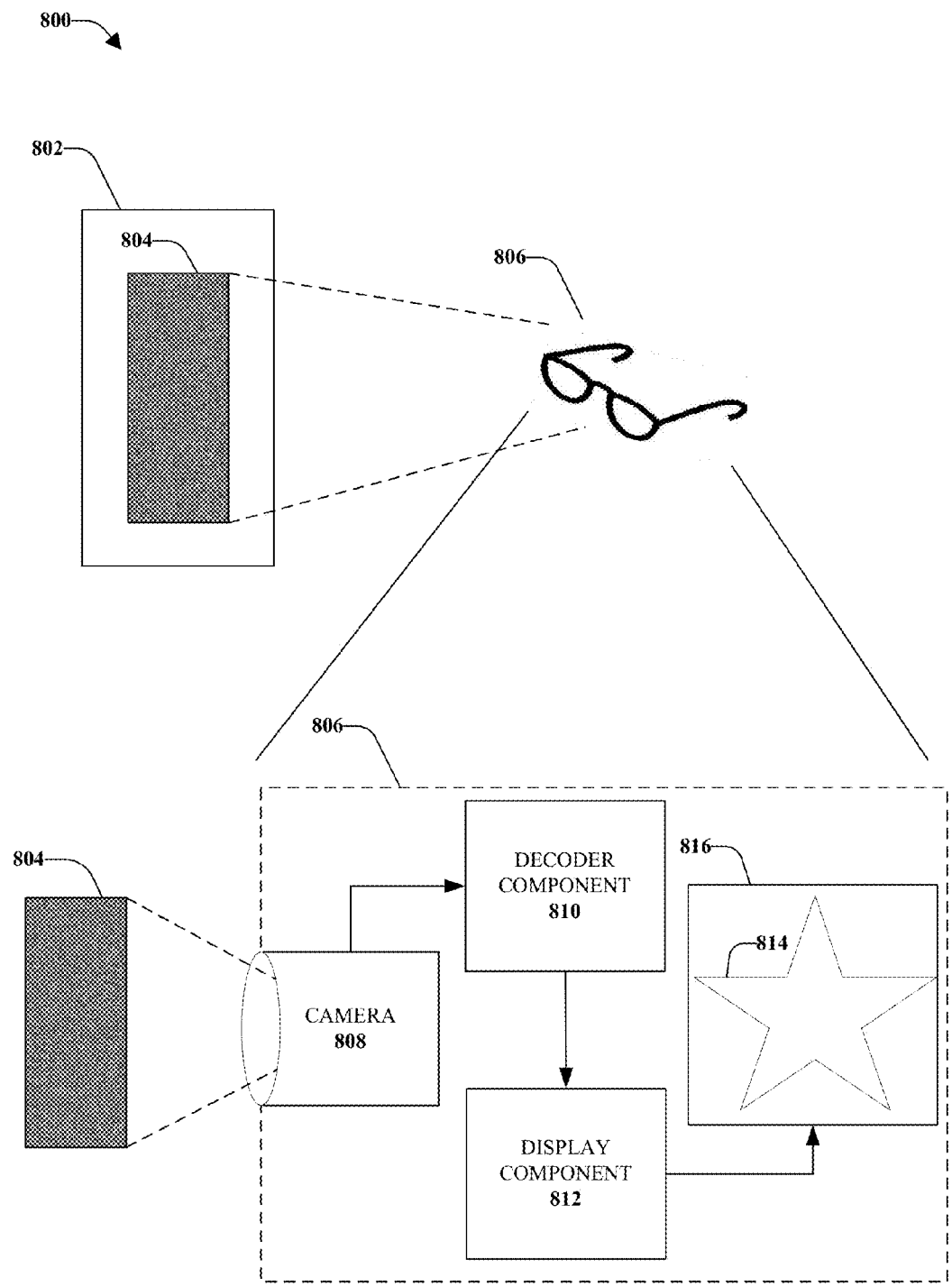
FIG. 8 is a block diagram illustrating an example, non-limiting embodiment of a viewing device for viewing a scrambled image.

By way of example, FIG. 1 illustrates a block diagram of an example, non-limiting embodiment of a system 100 for projecting, viewing, and interacting with a scrambled image. System 100 can include one or more projection display devices (e.g., 102 and 104), which are configured to project scrambled images 108 and 110 onto a display surface 106. Eyewear 112, in some examples, may include a viewing device (e.g., as shown in FIGS. 5, 6, 8, and/or 9) that is configured to descramble each scrambled images into a viewable image. The viewing device can further be configured to selectively descramble one of the overlaid scrambled images 108 and 110 and block the other scrambled image such that a single image is viewable.

It is to be noted that while FIG. 1 shows that projection display devices 102 and 104 are separate from eyewear 112, in some embodiments, one or more projection display devices can be built at least partly into the eyewear 112, e.g., integrated with the eyewear 112, so that the projection display device projects the scrambled image into the line of sight of the eyewear 112. The projection display devices 102 and 104 may also be detachable from the eyewear 112 to mount on a static surface to display a stable image.

The projection display devices 102 and 104 can include small digital and/or analog projectors that may use any of a variety of projection technologies including liquid crystal displays ("LCDs"), rotating color wheels, and/or laser diode beam steering, to generate images. Components in the projection display devices 102 and 104 can be configured to optically scramble the image to make it un-viewable unless a specialized viewing device (e.g., eyewear 112) is used to descramble the image. The scrambled image that is projected by the projection display devices 102 and 104 can be configured to project light in both visible and non-visible spectrums (e.g., infrared and ultraviolet) such that the scrambled images may be undetectable by the naked eye. The eyewear 112 can be adapted effective to translate the scrambled image from the non-visible spectrum to the visible spectrum so that the viewer can see the image.

In some embodiments, the scrambled images 108 and 110 can be generated by modulating one or more optical elements in the projection display devices 102 and 104 in response to a control signal. The scrambling algorithm can be reversed by the eyewear 112 in order to descramble the scrambled images 108 and 110.

In some embodiments, the light can be modulated in such a way that wavelengths and patterned pulses of light may represent commands, in essence creating a light-based ("photonic") communication system that can communicate according to a predetermined lexicon or a language, allowing an image to be constructed from the photonic commands. The viewing devices can be configured to identify and interpret the photonic commands, so that the received image can be processed and transformed into a viewable image via the eyewear 112. The viewing devices can also be used in contexts other than with eyewear (such as televisions, computers, mobile devices, etc.), allowing media to be transmitted securely, via light, from one point to another.

In some embodiments, access to descrambling algorithms and/or decryption keys used to convert the scrambled images into viewable images can be limited to those viewers with permission. Permission can be granted based on the identity of the viewer or a pass code entered by the viewer into either the eyewear, the projection display device, or other input devices communicatively coupled to the eyewear, or the projection display device. Other security protocols to enable access can be based on biometric systems (e.g., eye scans, voice scans, fingerprint scans, etc.).

Figure 2:
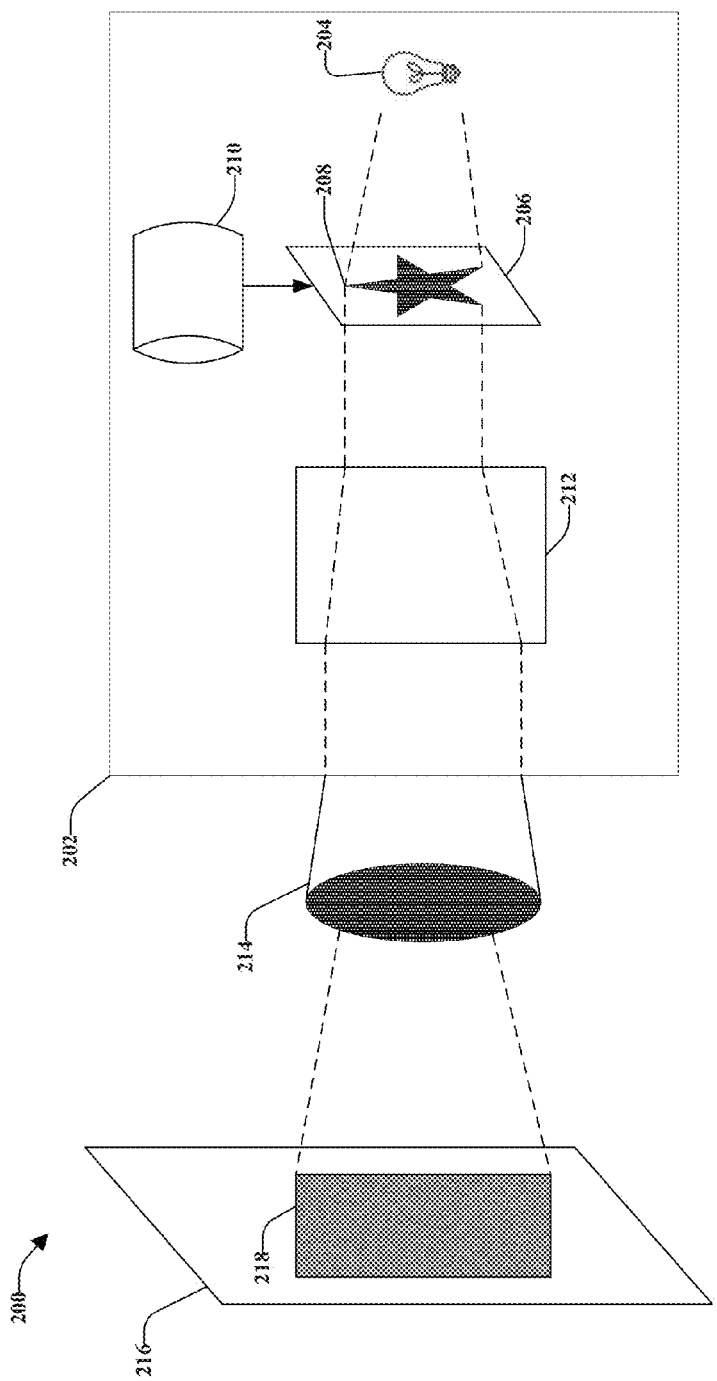
FIG. 2 is a block diagram illustrating an example, non-limiting embodiment of a projection display device.

Turning now to FIG. 2, a block diagram illustrating an example, non-limiting embodiment 200 of a projection display device 202 is shown. The projection display device 202 can be configured to display a scrambled image 218 on a display surface 216.

Projection display device 202 may include one or more of an electromagnetic radiation generation unit 204, beam-splitter unit 212, and/or a projection unit 214. The electromagnetic radiation generation unit 204 can be configured to generate radiation. The image generation unit 206 that can be configured to receive the radiation and a control signal, and responsively modulate the electromagnetic radiation based on the control signal to generate an image 208. The beam-splitter unit 212 can be configured to encode the image 208 to generate a scrambled image 218. A projection unit 214 can be configured to project the scrambled image 218 onto the display surface 216.

In some embodiments, the electromagnetic radiation generation unit 204 can be configured to generate light in both visible and non-visible spectrums. The light generated by electromagnetic radiation generation unit 204 may be blackbody, continuous spectrum radiation (e.g., an incandescent bulb) in some embodiments. In some other embodiments, the light generated by electromagnetic radiation generation unit 204 can be made up of substantially discrete wavelengths of light. Incandescent bulbs, light emitting diodes (LEDs), halide lamps are non-limiting examples of electromagnetic radiation generation unit 204. For some additional non-limiting examples, the light generated can also be coherent laser light generated from at least diode lasers, gas lasers, chemical lasers, and/or solid state lasers.

The image generation unit 206 can be configured to receive a control signal and modulate the light generated by the electromagnetic radiation generation unit 204 to generate an image 208. The control signal can be based on a digital media stream from a memory 210 in the projection display device 202. The image 208 can also be based on a digital media stream from the memory 210. In other embodiments, the control signal can also be received from multimedia sources external to the projection display device 202. The image generation unit 206 can be configured to generate the image 208 using LCDs and/or rotating color wheels. The image generation unit 206 can also be configured to generate the image 208 by modulating one or more laser beams effective to project a raster-based image.

Once the image 208 is generated, a beam-splitter unit 212 can be configured to encode the image. At least one optical element in the beam splitter unit can be dynamically manipulated, in accordance with a scrambling algorithm, to scramble the image into the scrambled image 218. The scrambled image 218 can be generated by splitting the light used to construct the image 208 into constituent parts using mirrors, lenses, filters, and other optical elements. The optical elements can be dynamically moved, rotated, and modulated in other manners in order to scramble the image. In some embodiments, the light entering beam-splitter unit 212 can already have been modulated into pulses of light with varying wavelengths. The pulses of light may represent the photonic communication system, and passive optical elements in the beam-splitter unit 212 can split the light beams apart into a non-viewable scrambled image 218.

In some embodiments, the beam-splitter unit 212 fragments the image 208 into separate components based on the wavelength of the image 208. The separate components can be wavelength bands corresponding to different colors. Once the image 208 is fragmented, beam-splitter unit can combine the fragments out of sequence, and the resulting scrambled image 218 can be projected by projection unit 214 on to the display surface 216.

Projection unit 214 can be configured to project the scrambled image 218 onto the display surface 216. Optical elements within projection unit 214 can be adjusted to focus scrambled image 218 on the display surface 216 based on the distance of the display surface 216 from the projection display device 202. The projection unit 214 can also be adjusted to change the shape, orientation, and tapering of the scrambled image 218 to match the display surface 216.

Figure 3:
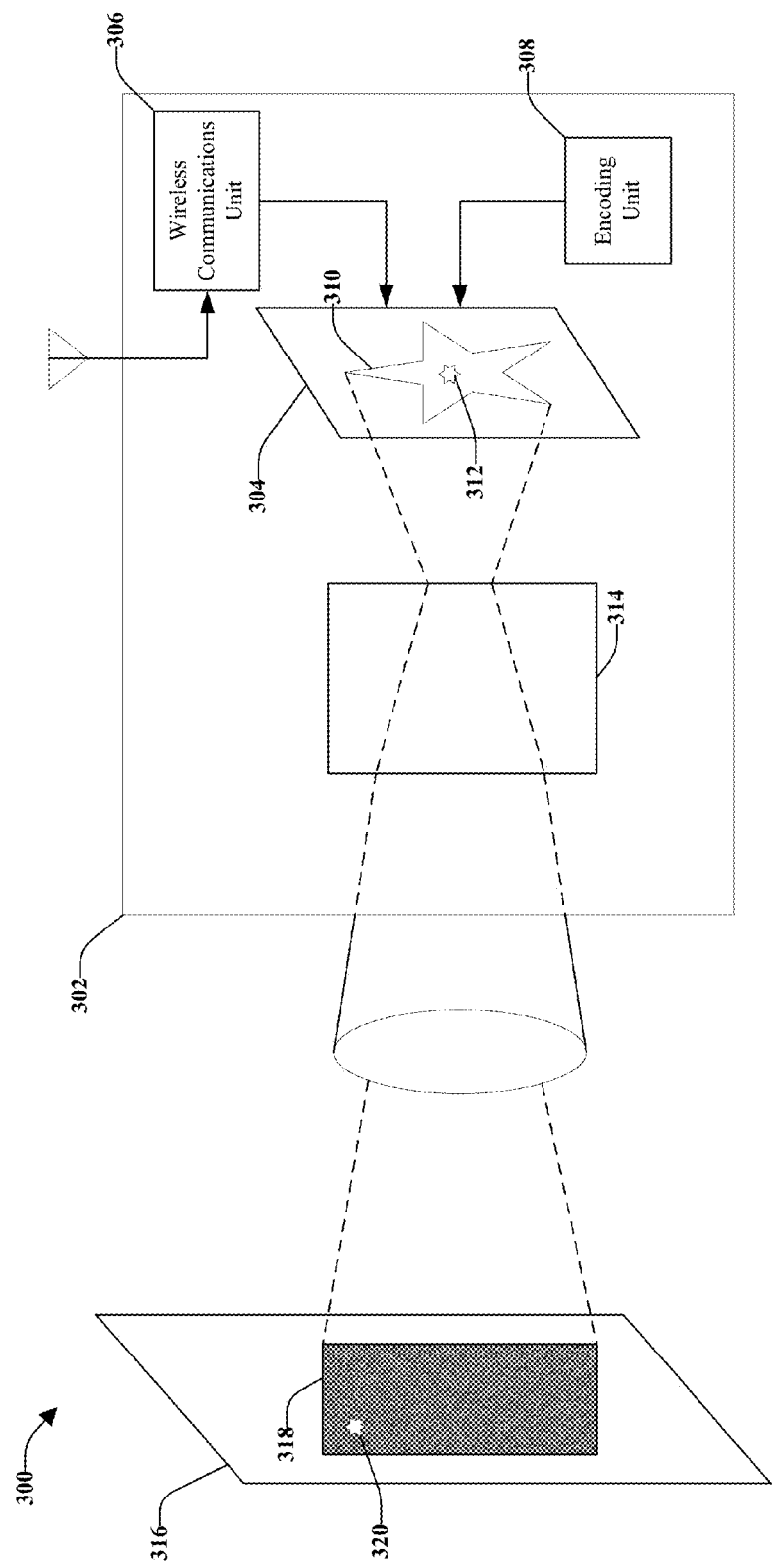
FIG. 3 is a block diagram illustrating an example, non-limiting embodiment of a projection display device.

Turning now to FIG. 3, a block diagram illustrating an example, non-limiting embodiment 300 of a projection display device 302 is shown. The projection display device 302 can project a scrambled image 318 onto a display surface 316.

The projection display device 302 may include one or more of an image generation unit 304, a wireless communication unit 306, and/or an encoding unit 308. Image generation unit 304 can be configured to receive a control signal and modulates light based on the control signal to create an image 310. The wireless communications unit 306 can be configured to receive a transmission of the control signal (not shown) from a wireless source (not shown). The encoding unit 308 can be configured to encode a marker 312 into at least one pixel of the image 310, such that the marker 312 can be used to identify the at least one pixel as being associated with the image 310.

The wireless communications unit 306 can be further configured to receive the control signal from an external source via an antenna (add label). The wireless communications unit 306 can be further configured to process the received transmission such that the control signal can be processed. The control signal, which can include the multimedia signal, can also provide instructions for scrambling the image 310 in accordance with a scrambling algorithm and/or an encryption key.

The encoding unit 308 can be configured to place a marker 312 in at least one pixel of the image 310. The marker 312 can be scrambled by the beam-splitter unit 314 into marker 320 in the resulting scrambled image 318. The marker 320 may identify the scrambled image 318 as being associated with the projection display device 302. In some embodiments, multiple projection display devices can be configured to project different scrambled images onto the same display surface (e.g., 316) and the markers allow the viewing devices to descramble and display respective images for respective viewers.

In some embodiments, the markers 312 and 320 may include one or more watermark(s) that identify the image as being associated with a particular projection display device. In other embodiments, the markers can be encoded into one or more pixels of the images. One or more pixels or portions of the image can be modified such that the modification identifies the projection display device from which the image was projected.

Figure 4:
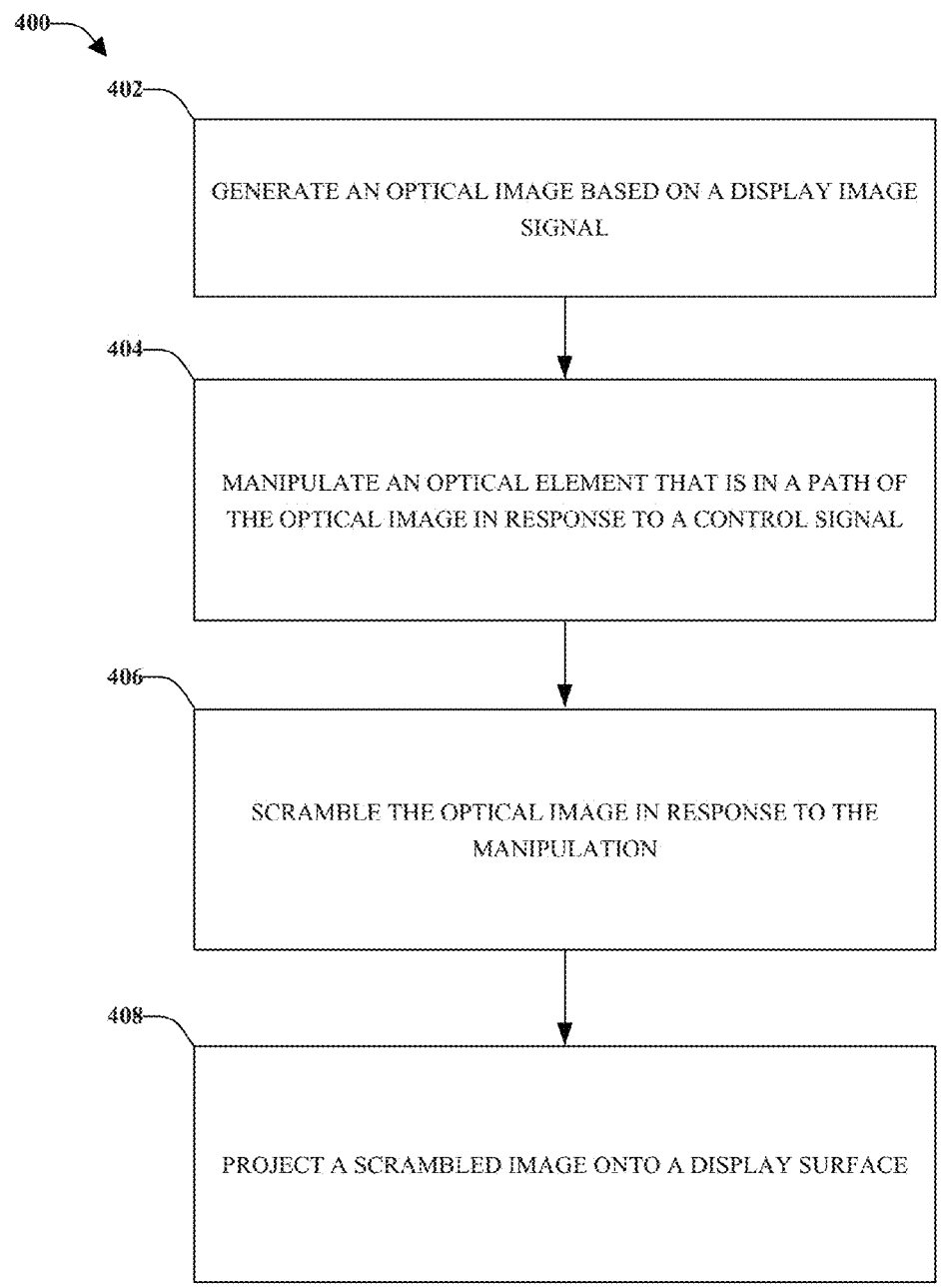
FIG. 4 illustrates a flow diagram of an example, non-limiting embodiment of a method for projecting a scrambled image.

FIG. 4 illustrates various processes arranged for use with the aforementioned systems or other embodiments described herein. The processes in FIG. 4 can be implemented, for example, by projection display devices 102 and 104, 202, and 302 illustrated in FIG. 1, FIG. 2, and FIG. 3, respectively.

FIG. 4 illustrates a flow diagram of an example, non-limiting embodiment of a method 400 for projecting a scrambled image. Example methods may include one or more operations, function, or actions as illustrated by one or more of blocks 402, 404, 406 and 408. Processing for method 400 may begin at block 402.

At block 402 (GENERATE AN OPTICAL IMAGE BASED ON A DISPLAY IMAGE SIGNAL), an optical image can be generated, such as by image generation unit 206 and/or image generation unit 304, in response to a display image signal. The display image signal can include a signal that may be used to generate the image. In some examples, the previously described image generation unit (e.g. 206, 304) can be configured to modulate and/or manipulate light generated by an electromagnetic radiation unit to generate an image. The image can be generated using LCDs, rotating color wheels, and/or by modulating one or more lasers to generate a raster-based image. Block 402 may be followed by block 404.

At block 404 (MANIPULATE AN OPTICAL ELEMENT THAT IS IN A PATH OF THE OPTICAL IMAGE IN RESPONSE TO A CONTROL SIGNAL), an optical element in a path of the optical image can be manipulated, such as by beam-splitter unit 212 and/or beam-splitter unit 314, effective to encode the optical image in response to the manipulation such that a scrambled image is generated by the optical element. Block 404 may be followed by block 406.

At block 406 (SCRAMBLE THE OPTICAL IMAGE IN RESPONSE TO THE MANIPULATION). At least one of the optical elements can be dynamically manipulated in response to a control signal according to a scrambling algorithm such that a scrambled image is generated. In some examples, the scrambled image can be generated by using a beam splitter (e.g. beam splitter beam-splitter unit 212) to split the light making up the image into a plurality of parts using mirrors, lenses, filters, and other optical elements. The optical elements can be controllably moved, rotated, and modulated in other manners in order to scramble the image in response to the control signal. Block 406 may be followed by block 408.

At block 408 (PROJECT THE SCRAMBLED IMAGE ONTO A DISPLAY SURFACE), the scrambled image can be projected, such as by projection unit 214, onto a display surface. Optical elements inside a projector can be adjusted to focus the scrambled image on the display surface based on the distance of the display surface from the projector. The optical elements can also be adjusted to change the shape, orientation, and proportions of the scrambled image to match the shape and/or contours of the display surface. The display surface can be any surface that an image can be projected onto, and does not need to be a dedicated display surface.

It is further noted that, for this and other processes and methods disclosed herein, the functions performed in the processes and methods may be implemented in differing order. Furthermore, the outlined steps and operations are only described as examples, and some of the steps and operations may be optional, combined into fewer steps and operations, or expanded into additional steps and operations without detracting from the essence of the disclosed embodiments.

Turning now to FIG. 5, a block diagram illustrating an example, non-limiting embodiment of a system 500 for viewing a scrambled image is shown. System 500 can include eyewear 506 that can receive a scrambled image 504 that is projected on a display surface 502.

A viewing device 508 can be at least partly built into, or attached to, eyewear 506, and configured to process the scrambled image 504. The viewing device 508 may include one or more of an intake lens group 510 and a combiner optical group 512. The intake lens group 510 can be configured to receive and focus incoming light beams from the scrambled image 504 that is displayed on the display surface 502. The combiner optical group 512 can be configured to modulate, in response to a control signal, an optical element effective to decode the scrambled image 504 into a viewable image 514.

Examples of eyewear 506 may include headsets, goggles, glasses, and other portable viewing systems. The viewing device 508, which can be a part of the eyewear 506, or detachable from the eyewear 506, or completely unrelated to eyewear 506, may include groups of optical elements such as the intake lens group 510 and the combiner optical group 512.

The intake lens group 510 can be a set of lenses that are arranged to operate to gather and focus the light from the scrambled image 504. The lenses in the intake lens group 510 can be adjusted to change the size and/or focus of the viewable image 514. In some embodiments, the orientation and shape of the viewable image can also be adjusted by manipulations to the intake lens group 510. For instance, when the scrambled image 504 and the display surface 502 are at a non-right angle (i.e., non-orthogonally aligned) relative to a plane of the eyewear 506, the intake lens group 510 can be adjusted to compensate for tapering and the keystone effect.

In some embodiments, the intake lens group 510 can be embedded with photo-chromic materials that, when electrically stimulated, can be controlled by the viewer to increase or decrease the background lighting conditions on demand. In some examples, intake lens group 510 may employ electronically transitioning lenses to facilitate automatic or manual adjustments of the brightness of the viewable image and surroundings as shown in the display. The electronically transitioning lenses may also have other adjustments such as color and/or contrast control, which may be manipulated by the user through an interactive multimedia display interface. In some examples, a small radial control mechanism, depression button actuator or slide control mechanism may be embedded into an arm of the eyewear 506, which can enable the user to adjust the brightness of the eyeglass lens: brighter for bright outdoor viewing conditions, and dimmer when transitioning to dark indoor viewing spaces, for instance.

The combiner optical group 512 may be configured to modulate one or more optical elements effective to decode the scrambled image into a viewable image. In some examples, the combiner optical group 512 may be configured to effectively combine the light beams that were previously split by the beam-splitter unit 212 in the projection display device. In still other examples, the combiner optical group 512 may be configured to modulate the one or more optical elements in accordance with a descrambling algorithm and/or decryption key that is associated with the scrambling algorithm/encryption key used to scramble the scrambled image 504.

In some embodiments, the descrambling algorithm and/or decryption key can be received by the viewing device via the scrambled image 504 as metadata embedded in the scrambled image 504. In other embodiments, the viewing device 508 can store the descrambling algorithm and/or decryption key in memory stored in the eyewear 506. A marker or identifier in the scrambled image 504 can indicate which descrambling algorithm and/or decryption key is associated with the scrambled image 504. A wireless communications unit in the eyewear 506 or the viewing device 508 can also be configured to receive the descrambling algorithm and/or decryption key wirelessly from a transmitter.

Turning now to FIG. 6, a block diagram illustrating an example, non-limiting embodiment of a viewing device that selects a scrambled image to view from a plurality of scrambled images is shown. System 600 can include a viewing device 602 that is configured to receive light from scrambled images 606 and 608, and to create a viewable image 622.

Viewing device 602 can include one or more of an intake lens group 612, and/or a combiner optical group 614. The intake lens group 612 can be configured to receive and focus incident light beams from the scrambled images 606 and 608. The combiner optical group 614 can be configured to dynamically modulate an optical element (not shown) effective to decode one or more of the scrambled images 608 and 606 into a viewable image 622.

Viewing device 602 may further include one or more of a selection component 616, a blocker component 618, and/or a translation component 620. The selection component 616 can be configured to select a scrambled image from among the scrambled images 606 and 608 received by the intake lens group 612. The blocker component 618 can be configured to block the scrambled images of the set of scrambled images that are not selected by the selection component 616. The translation component 620 can be configured to receive electromagnetic radiation in a non-visible wavelength from the selected scrambled image and translate the electromagnetic radiation of the non-visible wavelength into a light beam of a visible wavelength.

The selection component 616 can be configured to select the scrambled image to descramble based on the markers 604 and 610 that are associated with scrambled images 606 and 608 respectively. The markers or identifiers may indicate that the scrambled images are associated with a particular projection display device. In some embodiments, more than one projection display devices can project different scrambled images onto the same display surface and the markers allow the viewing device 602 to descramble and display a particular image or set of images for a given user.

In some embodiments, the markers 604 and 610 may include one or more watermark(s) that identify the image. In other embodiments, the markers 604 and 610 can be encoded into one or more pixels of the images. Each pixel of the image can be modified such that the modification identifies the projection display device from which the image was projected. The blocker component 618 can block the unselected scrambled image based on the markers 604 and 610. Any pixel or portion of an image that is associated with the marker can be blocked such that combiner optical group 614 only descrambles the selected scrambled image.

Figure 7:
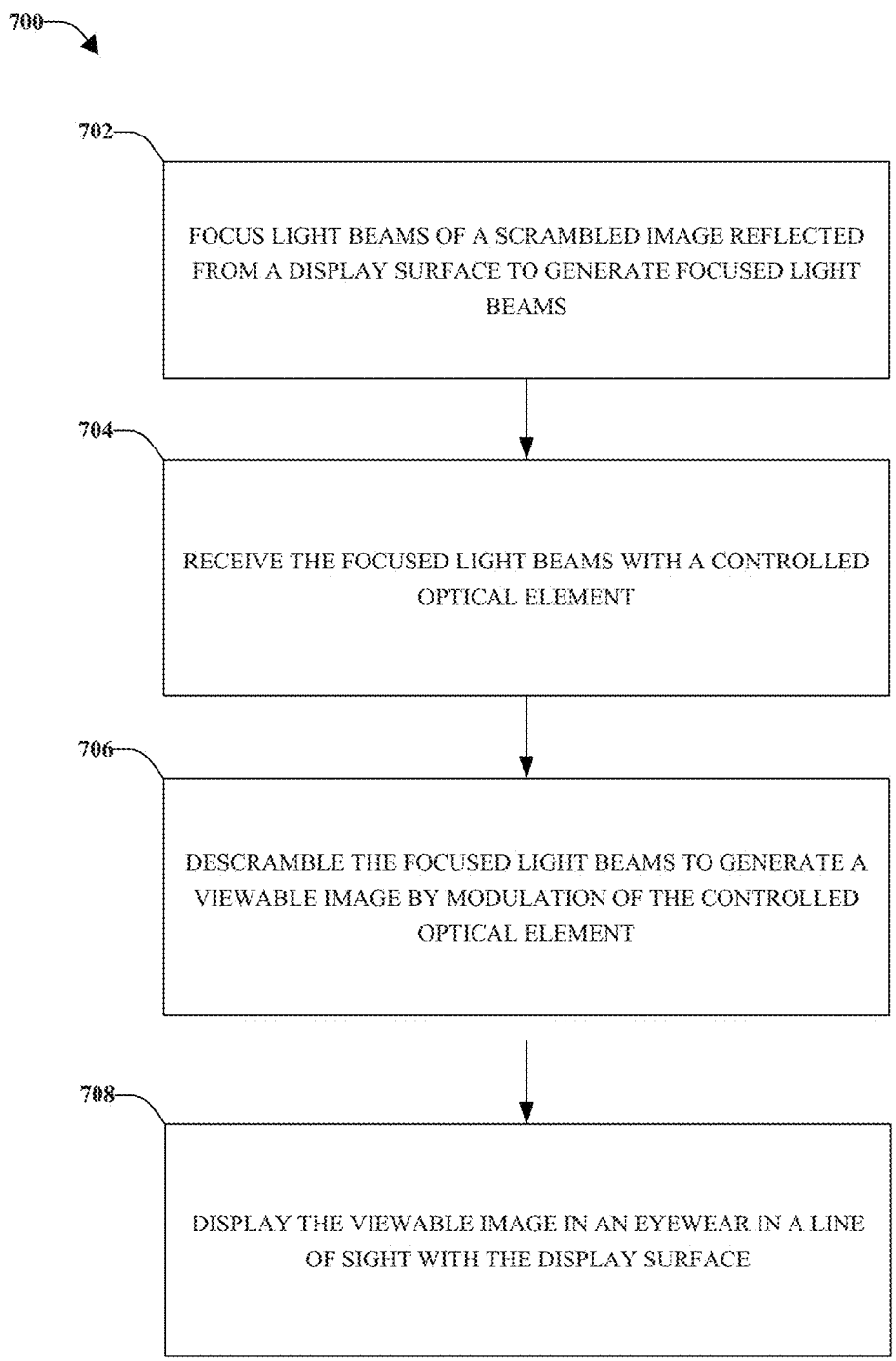
FIG. 7 illustrates a flow diagram of an example, non-limiting embodiment of a method for viewing scrambled images.

FIG. 7 illustrates various processes arranged for use with the aforementioned systems or other embodiments disclosed herein. The processes in FIG. 7 can be implemented for example by viewing devices 508 and 602 illustrated in FIG. 5 and FIG. 6, respectively.

FIG. 7 illustrates a flow diagram of an example, non-limiting embodiment of a method 700 for viewing scrambled images. Example methods may include one or more operations, function, or actions as illustrated by one or more of blocks 702, 704, 706 and/or 708. Processing for method 700 may begin at block 702.

At block 702 (FOCUS LIGHT BEAMS OF A SCRAMBLED IMAGE REFLECTED FROM A DISPLAY SURFACE TO GENERATE FOCUSED LIGHT BEAMS), light beams from a scrambled image reflected from a display surface may be focused, such as by intake lens group 510 and/or 612, to generate focused light beams. One or more lenses (such as in viewing device 602 shown in FIG. 6) can be configured operable to gather and focus the light from the scrambled image. The lenses can be adjusted to change the size and/or focus of a resulting viewable image. In some embodiments, the orientation and shape of the viewable image can also be changed by adjustments to the intake lens group. For instance, if the scrambled image and the display surface may beat a non-right angle relative to a focal plane of the eyewear, the intake lens group can be adjusted to compensate for tapering and the keystone effect. Block 702 may be followed by block 704.

At block 704 (RECEIVE THE FOCUSED LIGHT BEAMS WITH A CONTROLLED OPTICAL ELEMENT), the focused light beams may be received by one or more controlled optical elements (e.g., combiner optical group 512 and/or 614). The controlled optical elements can by lenses, prisms, mirrors, and/or filters that can be manipulated to descramble the image. Block 704 may be followed by block 706.

At block 706 (DESCRAMBLE THE FOCUSED LIGHT BEAMS TO GENERATE A VIEWABLE IMAGE BY MODULATION OF THE CONTROLLED OPTICAL ELEMENT), the one or more controlled optical elements (e.g., combiner optical group 512 and/or 614) are modulated to descramble the focused light beams to generate a viewable image. The focused light beams can be recombined and/or manipulated by the controlled optical elements in accordance with a descrambling algorithm that is associated with the scrambling algorithm used to scramble the scrambled image. Block 706 may be followed by block 708.

At block 708 (DISPLAY THE VIEWABLE IMAGE IN A VIEWING DEVICE), the viewable image (e.g., viewable image 514 and/or 622) is displayed in the viewing device in a line of sight with the display surface. The viewable image can be displayed in a viewing device such that the viewable image is perceived as in focus to the eyes of the viewer of the viewing device. The focus can be adjusted based on the eyesight of the viewer. The viewable image can also be displayed such that the image appears in the same position as the scrambled image on the display surface. Keeping the image stationary relative to the display surface can reduce motion sickness effects and nausea.

Turning now to FIG. 8, a block diagram illustrating an example, non-limiting embodiment 800 of a viewing device 806 for viewing a scrambled image is shown. The viewing device 806 can be configured to view a scrambled image 804 on a display surface 802.

The viewing device 806 can include one or more components that can be configured to process the scrambled image 804 to output an unscrambled image 814. In some embodiments, the viewing device 806 can include a camera 808, a decoder component 810, and a display component 812. The camera 808 may be configured to electronically capture the scrambled image 804 displayed on the display surface 802, and/or a decoder component 810 may be configured to unscramble the scrambled image into at least one unscrambled image 814. In some additional examples, the viewing device 806 can also include a display component 812 that may be configured to show the unscrambled image 814 in response to the scrambled image being decoded, where the unscrambled image 814 is shown at a fixed position relative to the scrambled image 804 on the display surface 802.

In various examples, viewing device 806 may include a camera 808 or other image capture device such as a digital camera that may use a CCD and/or CMOS sensor. The camera 808 can include one or more lenses that can adjust the size and/or the focus of the scrambled image 804 before electronic capture. Once captured electronically, the captured image (e.g., a digital image) can be coupled to a decoder component 810, which may be configured to unscramble the scrambled image 804 using a descrambling algorithm and/or decryption key that is associated with the scrambled image.

In some embodiments, the descrambling algorithm and/or the decryption key can be transmitted wirelessly to the viewing device 806. In other embodiments, the descrambling algorithm and/or the decryption key can be embedded into the scrambled image 804, such that the decoder component 810 can analyze the scrambled image 804 to derive the scrambling algorithm/decryption key. In some examples, the decryption key can be associated with the projection display device that projected the scrambled image 804, or it can be associated with the multimedia source.

The display component 812 can be arranged to receive the unscrambled image 814 from the decoder component 810, and responsively display the unscrambled image 814. In some examples, the unscrambled image 814 may be viewed on a heads-up display (HUD) 816 positioned within a line of sight of the scrambled image 804. As previously described, showing the unscrambled image 814 in a substantially fixed position relative to the HUD 816, even when the viewing device 806 may be changing orientations can cause motion sickness. In order to minimize motion sickness and nausea, the display component 812 can be configured to display the unscrambled image 814 at a fixed position relative to the scrambled image 804 on the display surface 802, even if the viewing device 806 is in motion.

In some embodiments, the display component 812 can also be configured to correct the orientation and tapering of the scrambled image 804 when it reproduces the unscrambled image 814. For example, the viewing device 806 can observe the scrambled image 804 at an angle where the scrambled image 804 appears highly tapered, and the display component 812 can be configured to correct for the tapering, e.g., via interpolative processes or perspective transforms, such that the unscrambled image 814 may be observed as if it was viewed at an angle perpendicular to the plane of the image.

In some embodiments, the viewing device 806 may include one or more stereoscopic cameras. One or more display components can be configured to display the unscrambled images from the stereoscopic cameras in two HUDs. Each HUD can be viewed by one eye of the viewer via viewing device 806 such that the viewer perceives a 3-dimensional (3D) image.

Figure 9:
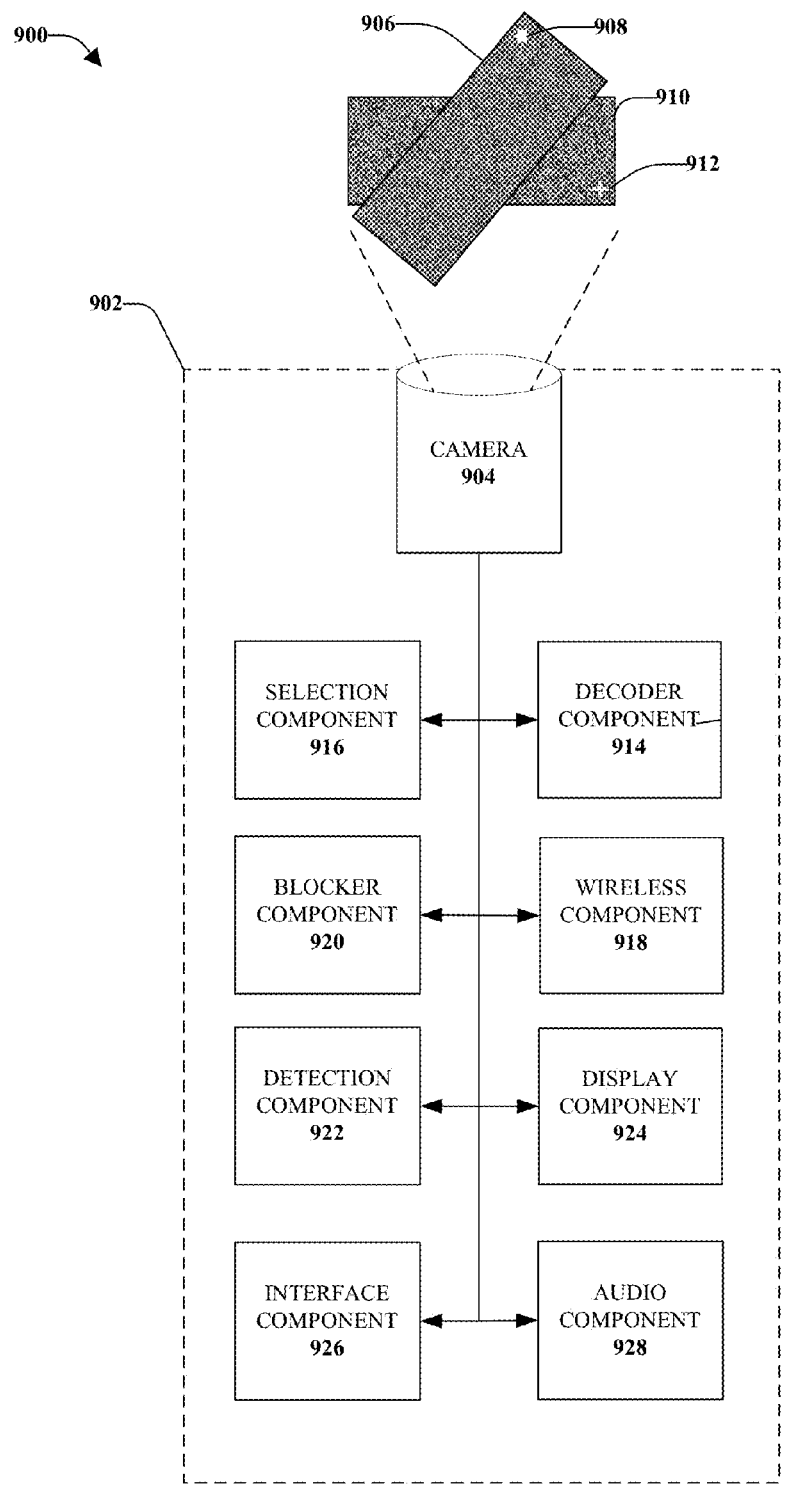
FIG. 9 is a block diagram illustrating an example, non-limiting embodiment of a viewing device for viewing a scrambled image.

Turning now to FIG. 9, a block diagram illustrating an example, non-limiting embodiment 900 of a viewing device 902 configured to view a scrambled image. A viewing device 902 may be configured to observe a set of scrambled images 906 and 910 and process the set of scrambled images to display a viewable image. Viewing device 902 may include a camera 904 that is configured to electronically capture the scrambled images. A number of additional components on the viewing device 902 can be used to assist in processing and displaying the viewable image, such as one or more of a detection component 922, a decoder component 914, a selection component 916, a wireless component 918, a blocker component 920, a display component 924, an interface component 926, and/or an audio component 928.

The detection component 922 can be configured to detect identifiers 908 and 912 encoded into a pixel of the scrambled images 906 and 910, respectively, where the identifiers may indicate that the pixel is associated with the scrambled image. In some embodiments, the identifiers 908 and 912 can be or may include a watermark that identifies the image. In other embodiments, the markers can be encoded into one or more pixels of the images. Each pixel of the image can be modified such that the modification identifies the projection display device from which the image was projected.

The selection component 916 can be configured to select a scrambled image from among scrambled images 906 and 910, captured by the camera, and then, the decoder component 914 can be adapted to decode the selected scrambled image. The blocker component 920 can be configured to block the scrambled images of the set of scrambled images that are not selected by the selection component 916. The selection component 916 can be adapted to select the scrambled image to descramble based on the markers 908 and 912 identified by the detection component 922. The markers (or identifiers) may indicate that the scrambled images are associated with a particular projection display device. In some embodiments, more than one projection display devices can be configured to project scrambled images onto the same display surface and the markers be utilized by the viewing device 902 to descramble and display an image from a particular projection display device.

The blocker component 920 can be configured to block the unselected scrambled image based on the markers 908 and 912. A pixel or portion of an image with a marker that is associated with the unselected scrambled image can be blocked by blocker component 920. Decoder component 914 will then descramble the selected scrambled image and display component 924 will display just the selected unscrambled image.

The wireless component 918 can be configured to receive a scrambled or unscrambled image transmitted wirelessly. Display component 924 can be configured to display unscrambled image directly, and decoder component 914 can descramble the scrambled image before display component 924 displays the wirelessly transmitted image in the HUD. In some embodiments, the viewing device 902 can be configured to receive the multimedia display directly from a wireless source without having to electronically capture a projected scrambled image. To playback the multimedia, a decryption key may be used to decrypt the transmitted multimedia. The decryption key and/or pass code can be entered manually, stored in the viewing device 902, or received from an input device communicatively coupled to the viewing device 902, e.g., via wireless means. The audio component 928 can be configured to playback an audio stream that is associated with the viewable image displayed by the display component 924. Speakers in the viewing device 902 can be configured to playback the audio into the ears of the viewer wearing the viewing device 902. In some embodiments, the audio stream can be embedded in a series of scrambled images and be processed by the viewing device 902. In other embodiments, the audio can be received from an external source (e.g., the projection display device) by the wireless component 918.

The interface component 926 can be configured to translate external motions imaged by the camera 904 into interface commands that control the display component. For example, hand gestures and the like can be captured by the camera 904, identified as command gestures, and the commands that are associated with the gestures can be executed in response to recognizing the identified command gestures. In some examples, command gestures can be used to change settings on the viewing device 902 such as making the display brighter or dimmer and changing the volume of the audio. In some other examples, command gestures can also be used to control the playback of the media, whether it is streamed directly to the viewing device 902, or is projected as scrambled images by a projection display device. The commands can be sent by the wireless component 918 to the projection display device, and can include such instructions to rewind, play, and stop the multimedia. Other instructions to both the viewing device 902 and the projection display device are possible as well.

In some embodiments, the interface component 926 can be linked to radial control mechanisms, depression button actuators and/or slide control mechanisms embedded into the viewing device 902 that can be adjusted to execute commands associated with playback of the multimedia.

Figure 10:
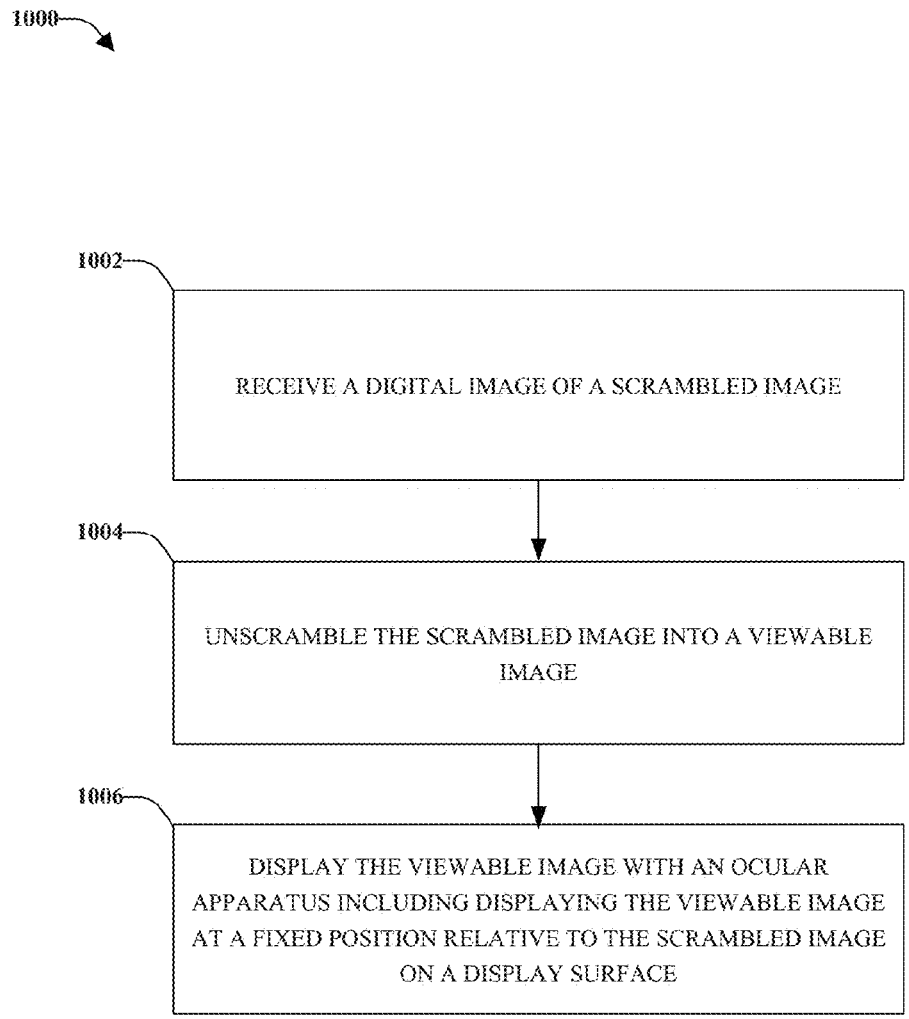
FIG. 10 illustrates a flow diagram of an example, non-limiting embodiment of a method for viewing a scrambled image.

FIG. 10 illustrates various processes arranged for use with the aforementioned systems, or other embodiments described herein. The processes in FIG. 10 can be implemented for example by devices 806 and 902 illustrated in FIG. 8 and FIG. 9, respectively. FIG. 10 illustrates a flow diagram of an example, non-limiting embodiment of a method 1000 for viewing a scrambled image. Example methods may include one or more operations, function, or actions as illustrated by one or more of blocks 1002, 1004, and/or 1006. Processing for method 1000 may begin at block 1002. At block 1002 (RECEIVE A DIGITAL IMAGE OF A SCRAMBLED IMAGE), a digital image of a scrambled image is received. The digital image can be produced by a camera on a viewing device (e.g. by camera 808 and/or 904). The camera can use charge-coupled device (CCD) and/or complementary metal-oxide semiconductor (CMOS) sensors to capture the image and the image can be stored in a memory on the viewing device or can be sent directly to a decoder component which receives the digital image. Block 1002 may be followed by block 1004.

At block 1004 (UNSCRAMBLE THE SCRAMBLED IMAGE INTO A VIEWABLE IMAGE), the scrambled image is unscrambled into a viewable image. A decoder component (e.g. decoder component 810 and/or 914) can unscramble the scrambled image using a descrambling algorithm and/or decryption key that is associated with the scrambled image. In some embodiments, the descrambling algorithm or the decryption key can be transmitted wirelessly (e.g. via wireless component 918) to the viewing device and in other embodiments, the descrambling algorithm or the decryption key can be embedded into the scrambled image, such that the scrambled image is analyzed to derive the scrambling algorithm/decryption key. The decryption key can be associated with the projection display device that projected the scrambled image (e.g., by projection display device 202 and/or 302). Block 1004 may be followed by block 1006.

At block 1006 (DISPLAY THE VIEWABLE IMAGE WITH AN OCULAR APPARATUS AT A FIXED POSITION RELATIVE TO THE SCRAMBLED IMAGE ON A DISPLAY SURFACE), the viewable image is displayed with an ocular device and is displayed at a fixed position relative to the scrambled image on a display surface (e.g., by display component 812 and/or 924). The ocular device can be a part of a transparent HUD. Displaying the viewable image in a fixed position relative to the HUD, even when the viewing device may be changing orientations can cause motion sickness. Therefore, the ocular device displays the viewable image at a fixed position relative to scrambled image on the display surface, even if the viewing device is being move around.

Example Computing Environment

Figure 11:
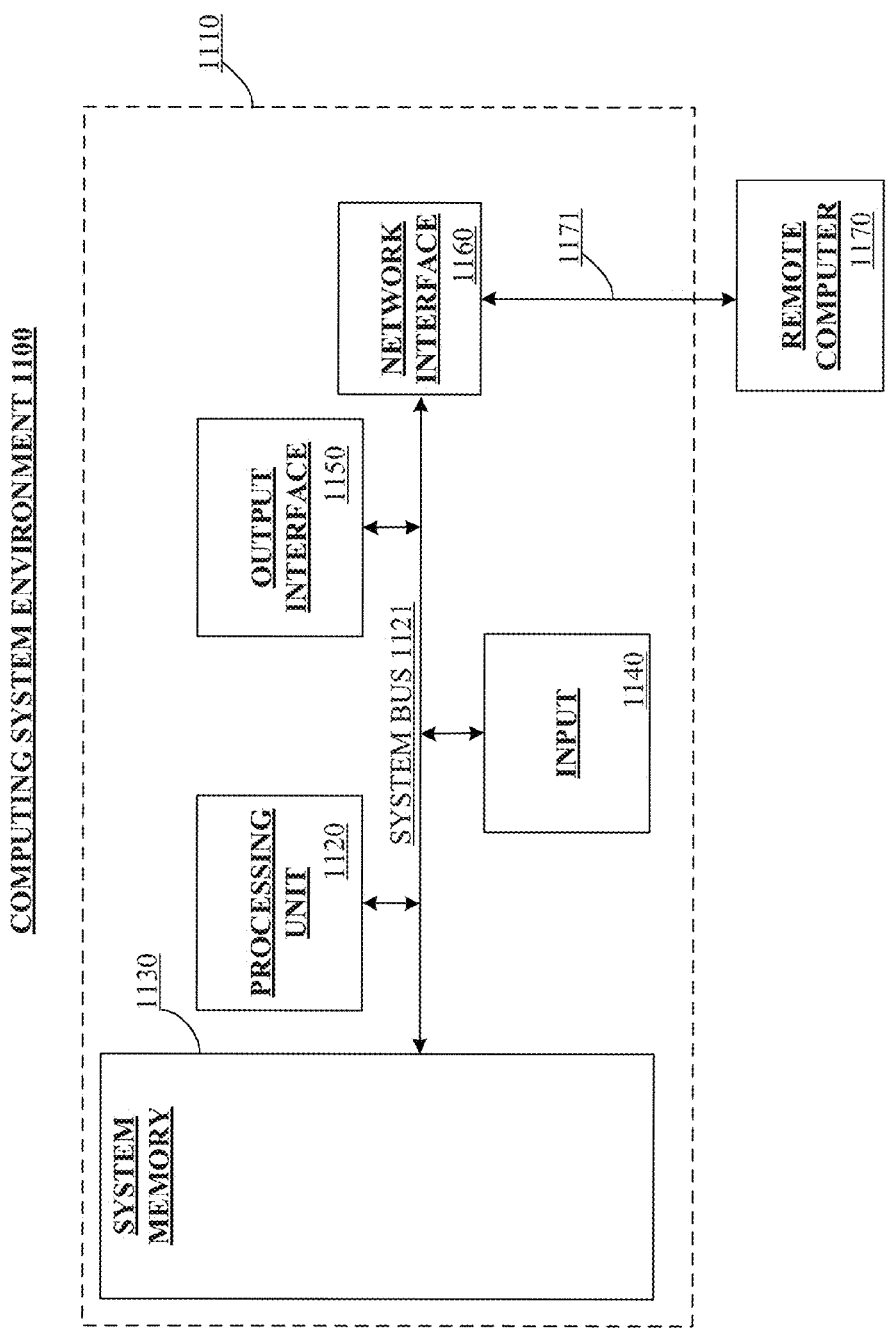
FIG. 11 is a block diagram illustrating an example computing device that is arranged for at least some of the embodiments of the subject disclosure.

As mentioned, the disclosed subject matter applies to any device wherein it may be desirable to communicate data, e.g., to or from a projection display device, or a viewing device attached to or integrated into eyewear. It should be understood, therefore, that handheld, portable and other computing devices and computing objects of all kinds are contemplated for use in connection with the disclosed subject matter, e.g., anywhere that a device can communicate data or otherwise receive, process or store data. Accordingly, the below general purpose remote computer described below in FIG. 11 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 11 illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing system environment 1100 be interpreted as having any dependency or requirement relating to any one or combination of components illustrated in the exemplary operating environment.

With reference to FIG. 11, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, may be stored in system memory 1130. System memory 1130 typically also contains data and/or program modules that are immediately accessible to and/or presently being operated on by processing unit 1120. By way of example, and not limitation, system memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from device 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 11 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface or adapter 1160. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of user input 1140, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

While the disclosed subject matter has been described in connection with the preferred embodiments of the various figures, it is to be understood that other similar embodiments may be used or modifications and additions may be made to the described embodiment for performing the same function of the disclosed subject matter without deviating therefrom. For example, one skilled in the art will recognize that the disclosed subject matter as described in the present application applies to communication systems using the disclosed techniques, systems, and methods and may be applied to any number of devices connected via a communications network and interacting across the network, either wired, wirelessly, or a combination thereof.

Accordingly, while words such as transmitted and received are used in reference to the described communications processes, it should be understood that such transmitting and receiving is not limited to digital communications systems, but could encompass any manner of sending and receiving data suitable for implementation of the described techniques. As a result, the disclosed subject matter should not be limited to any single embodiment, but rather should be construed in breadth and scope in accordance with the appended claims.

Example Networking Environment

One of ordinary skill in the art can appreciate that the disclosed subject matter can be implemented in connection with any computer or other client or server device, which can be deployed as part of a communications system, a computer network, or in a distributed computing environment, connected to any kind of data store. In this regard, the disclosed subject matter pertains to any computer system or environment having any number of memory or storage units, and any number of applications and processes occurring across any number of storage units or volumes, which may be used in connection with communication systems using the techniques, systems, and methods in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving, storing, and/or transmitting information in connection with remote or local services and processes.

Distributed computing provides sharing of computer resources and services by exchange between computing devices and systems. These resources and services can include the exchange of information, cache storage, and disk storage for objects, such as files. Distributed computing takes advantage of network connectivity, allowing clients to leverage their collective power to benefit the entire enterprise. In this regard, a variety of devices can have applications, objects, or resources that may implicate the communication systems using the techniques, systems, and methods of the disclosed subject matter.

Figure 12:
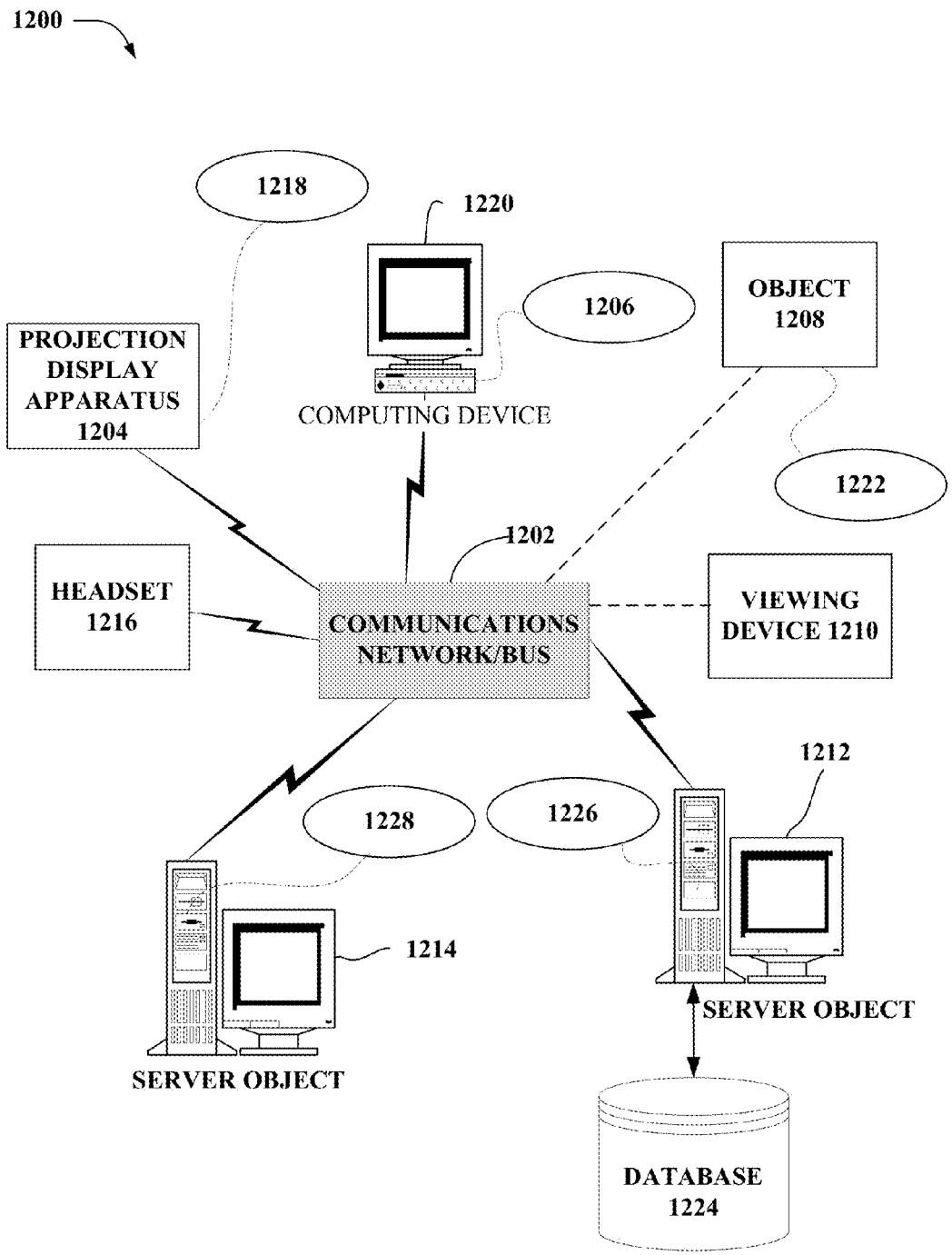
FIG. 12 is a block diagram illustrating an example networking environment that can be employed in accordance with the claimed subject matter.

FIG. 12 is a schematic diagram illustrating an exemplary networked or distributed computing environment 1200. The distributed computing environment 1200 comprises computing objects 1214, 1212, 1220, and etc. and projection display device 1204, computing object 1208, viewing device 1210, headset 1216, and etc. These objects can comprise programs, methods, data stores, programmable logic, etc. The objects can also comprise portions of the same or different devices such as projectors, virtual reality headsets, etc. Each object can communicate with another object by way of the communications network 1202. This network can itself comprise other computing objects and computing devices that provide services to the system of FIG. 12, and can itself represent multiple interconnected networks. In accordance with an aspect of the disclosed subject matter, each object, device, or devices 1204, 1208, 1210, 1212, 1214, 1216, 1220, and etc. can contain an application that can make use of an API, or other object, software, firmware and/or hardware, suitable for use with the techniques in accordance with the disclosed subject matter.

It can also be appreciated that an object, such as 1208, can be hosted on another computing device, projection display device, and/or viewing device. Thus, although the physical environment depicted may show the connected devices as computers, such illustration is merely exemplary and the physical environment may alternatively be depicted or described comprising various digital devices, any of which may employ a variety of wired and wireless services, software objects such as interfaces, COM objects, and the like.

There is a variety of systems, components, and network configurations that support distributed computing environments. For example, computing systems can be connected together by wired or wireless systems, by local networks or widely distributed networks. Currently, many of the networks are coupled to the Internet, which can provide an infrastructure for widely distributed computing and can encompass many different networks. Any of the infrastructures can be used for communicating information used in systems employing the techniques, systems, and methods according to the disclosed subject matter.

The Internet commonly refers to the collection of networks and gateways that utilize the Transmission Control Protocol/Internet Protocol (TCP/IP) suite of protocols, which are well known in the art of computer networking. The Internet can be described as a system of geographically distributed remote computer networks interconnected by computers executing networking protocols that allow users to interact and share information over network(s). Because of such widespread information sharing, remote networks such as the Internet have thus far generally evolved into an open system with which developers can design software applications for performing specialized operations or services, essentially without restriction.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to communication (wired or wirelessly) using the techniques, systems, and methods of the disclosed subject matter may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be delivered over a communications medium, e.g., client(s) and server(s) can be coupled to one another via TCP/IP connection(s) for high-capacity communication.

Thus, FIG. 12 illustrates an exemplary networked or distributed environment, with server(s) in communication with client computer (s) via a network/bus, in which the disclosed subject matter may be employed. In more detail, a number of servers 1214, 1212, etc. are interconnected via a communications network/bus 1202, which can be a LAN, WAN, intranet, GSM network, the Internet, etc., with a number of client devices 1204, 1208, 1210, 1216 and etc., such as a projection display device, viewing device, headset, and the like in accordance with the disclosed subject matter. It is thus contemplated that the disclosed subject matter can apply to any computing device in connection with which it is desirable to communicate data over a network.

In a network environment in which the communications network/bus 1202 is the Internet, for example, the servers 1212 and 1214 can be Web servers with which the clients 1204, 1208, 1210, 1216 and etc. communicate via any of a number of known protocols such as HTTP.

Each client computer 1204, 1208, 1210, 1216, 1220 and etc. and server computers 1212, and 1214. can be equipped with various application program modules or objects 1218, 1206, 1222, 1226, 1228, etc. and with connections or access to various types of storage elements or objects, across which files or data streams may be stored or to which portion(s) of files or data streams may be downloaded, transmitted or migrated. Any one or more of computers 1204, 1208, 1210, 1212, 1214, 1216, and etc. can be responsible for the maintenance and updating of a database 1224 or other storage element, such as a database or memory 1224 for storing data processed or saved based on, or the subject of, communications made according to the disclosed subject matter. Thus, the disclosed subject matter can be utilized in a computer network environment having client devices 1204, 1208, 1210, 1216, 1220, and etc. that can access and interact with a communication network/bus 1202 and server computers 1212 and 1214.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A projection display device, comprising:
   an electromagnetic radiation generation unit configured to generate radiation;
   an image generation unit configured to receive a control signal and modulate the radiation based on the control signal such that an image is generated;
   a beam-splitter unit configured to encode the image, wherein at least one optical element in the beam-splitter unit is manipulated to split the image into a plurality of components, wherein the plurality of components correspond to respective ranges of wavelengths of radiation associated with the image, and wherein the beam-splitter unit is further configured to scramble the plurality of components into a scrambled image;
   a projection unit configured to project the scrambled image onto a display surface; and
   an encoder unit configured to encode a marker into at least one pixel of the scrambled image, wherein the marker identifies the at least one pixel as being associated with the scrambled image.

2. The projection display device of claim 1, wherein the electromagnetic radiation generation unit comprises a plurality of laser light sources.

3. The projection display device of claim 1, wherein the radiation is electromagnetic radiation in a non-visible spectrum.

4. The projection display device of claim 1, wherein the at least one optical element comprises at least one of a mirror, a lens, or a filter.

5. The projection display device of claim 1, further comprising a wireless communications unit configured to receive a transmission of the control signal from a wireless source.

6. The projection display device of claim 1, wherein the control signal is a first control signal, and the beam-splitter unit is further configured to scramble the plurality of components based on a second control signal.

7. An apparatus, comprising:
   an electromagnetic radiation unit configured to generate radiation;
   an image generation unit configured to receive a control signal and modulate the radiation based on the control signal to create an image;
   a scrambler unit configured to deconstruct the image into pulses of light and rearrange the pulses of light into a scrambled image, wherein the pulses of light are represented according to different wavelength bands; and
   a projection unit configured to project the scrambled image onto a display surface, wherein a marker is encoded into a portion of the scrambled image, and wherein the marker identifies the portion as being associated with the scrambled image.

8. The apparatus of claim 7, wherein the electromagnetic radiation unit comprises a plurality of laser light sources.

9. The apparatus of claim 7, wherein the radiation is electromagnetic radiation in a non-visible spectrum.

10. The apparatus of claim 7, wherein the scrambler unit comprises at least one of a mirror, a lens, or a filter.

11. The apparatus of claim 7, further comprising a wireless communications unit configured to receive the control signal from a wireless source.

12. The apparatus of claim 7, wherein the marker is encoded into at least one pixel of the scrambled image.

13. A method, comprising:
receiving, by a device comprising a processor, from an electromagnetic radiation unit, radiation;
receiving, by the device, a control signal;
modulating, by the device, the radiation based on the control signal to create an image;
deconstructing, by the device, the image into pulses of light and rearrange the pulses of light into a scrambled image, wherein the pulses of light are represented according to different wavelength bands;
projecting, by the device, the scrambled image onto a display surface; and
encoding, by the device, a marker into a pixel of the scrambled image, the marker identifying the pixel as being associated with the scrambled image.

14. The method of claim 13, wherein the receiving the radiation from the electromagnetic radiation unit comprises receiving the radiation from a plurality of laser light sources.

15. The method of claim 13, wherein the radiation is electromagnetic radiation in a non-visible spectrum.

16. The method of claim 13, wherein the deconstructing comprises deconstructing the image with at least one of a mirror, a lens, or a filter.

17. The method of claim 13, wherein the receiving further comprises receiving the control signal from a wireless source.

18. The method of claim 13, wherein the encoding comprises encoding a watermark into the pixel of the scrambled image.

19. A computer-readable storage device storing executable instructions that, in response to execution, cause a system comprising a processor to perform or control operations, comprising:
identifying radiation emitted from an electromagnetic radiation unit;
identifying a control signal;
modulating the radiation based on the control signal to create an image;
deconstructing the image into pulses of light and rearrange the pulses of light into a rearranged image, wherein the pulses of light are represented according to different wavelength bands;
projecting the rearranged image onto a display surface; and
encoding, into a segment of the scrambled image, a marker that identifies the segment as being associated with the scrambled image.

20. The computer-readable storage device of claim 19, wherein the electromagnetic radiation unit comprises a plurality of laser light sources.

21. The computer-readable storage device of claim 19, wherein the radiation is electromagnetic radiation in a non-visible spectrum.

22. The computer-readable storage device of claim 19, wherein the deconstructing comprises deconstructing the image with at least one of a mirror, a lens, or a filter.

23. The computer-readable storage device of claim 19, wherein the receiving further comprises receiving the control signal wirelessly.

24. The computer-readable storage device of claim 19, wherein the encoding comprises encoding the marker into at least one pixel of the scrambled image.

* * * * *